United States Patent [19]
Osada et al.

[11] 4,448,844
[45] May 15, 1984

[54] HEAT RESISTANT RESIN AND PROCESS FOR PRODUCING THE SAME

[75] Inventors: Yuichi Osada; Shozo Kasai; Yasunori Okada; Isao Uchigasaki, all of Hitachi; Toyoji Oshima, Higashikurume; Yoshiyuki Mukoyama, Hitachi; Hiroshi Nishizawa, Kitaibaraki, all of Japan

[73] Assignee: Hitachi Chemical Co., Ltd., Tokyo, Japan

[21] Appl. No.: 518,109

[22] Filed: Jul. 28, 1983

[30] Foreign Application Priority Data

Apr. 6, 1981 [JP] Japan .................................. 56-52108

[51] Int. Cl.$^3$ ........................ D02G 3/00; B32B 15/08; H01B 7/00
[52] U.S. Cl. .................................... 428/375; 428/379; 428/458; 524/104; 174/110 SR
[58] Field of Search ...................... 428/375, 379, 458; 174/110 R, 110 SR, 120 SR; 524/104, 323, 594, 597, 589; 528/67, 73, 323

[56] References Cited

U.S. PATENT DOCUMENTS 3,658,773  4/1972  Lecher et al. ......................... 528/67
4,294,952 10/1981  Mokoyama et al. ................ 428/458

*Primary Examiner*—George F. Lesmes
*Assistant Examiner*—Beverly K. Johnson
*Attorney, Agent, or Firm*—Antonelli, Terry & Wands

[57] ABSTRACT

A heat resistant resin produced by reacting (A) a polyamideimide resin with (B) an alcohol component and (C) an acid component with heating is soluble in a cresol type solvent and gives coatings excellent in heat resistance, thermal shock resistance, wear resistance, resistance to hydrolysis, etc., suitable for enamelled wire.

8 Claims, No Drawings

HEAT RESISTANT RESIN AND PROCESS FOR PRODUCING THE SAME

This is a division of application Ser. No. 363,799, filed Mar. 31, 1982.

This invention relates to a heat resistant resin and a process for producing the same.

Recently, polyester series varnishes are widely used as varnishes for electrical insulation, particularly for enamelled wire, since they have relatively balanced properties in mechanical properties, heat resistance, price, etc. But polyester wire cannot fully satisfy recent demands for (1) improvement in heat resistance for miniaturization and weight saving or increasing reliability of electric machines and devices, (2) improvement in wear (abrasion) resistance for rationalization of production of coils, (3) improvement in thermal (heat) shock resistance for shortening the heating time of impregnated varnishes, (4) improvement in resistance to hydrolysis in response to an increase of closed type machines and devices, etc. As a varnish for meeting these demands, there are proposed polyamideimide varnishes. But polyamideimide resins are generally insoluble in a cresol type solvent which is a cheap and general purpose solvent and only soluble in a polar solvent such as expensive N-methylpyrrolidone, dimethylacetamide, etc. Further, since the polyamideimide resin itself is expensive, the resulting polyamideimide with an expensive solvent naturally becomes very expensive.

In order to improve the above-mentioned disadvantages of the polyester varnish and to solve the economical problem of polyamideimide resin, various proposals have been made but they are insufficient, for example, in compatibility of the two resins, physical properties of the resulting coatings, transparency and gloss of the resulting film, etc.

This invention provides a heat resistant resin which is obtained by modifying a polyamideimide resin soluble in a cresol type solvent and has improved properties in thermal shock resistance, heat resistance, resistance to hydrolysis and wear resistance compared with polyester resins, a heat resistant resin composition and a process for producing said heat resistant resin.

This invention provides a heat resistant resin produced by reacting with heating
(A) a polyamideimide resin obtained by reacting in a cresol type solvent
  (a) a polyisocyanate containing an isocyanurate ring in an amount of 0 to 30 equivalent percents based on the total isocyanate equivalent,
  (b) a diisocyanate,
  (c) a lactam,
  (d) a tricarboxylic acid anhydride, and
  (e) a compound different from the component (d) and having the formula:

$$\begin{array}{c} X^1 \\ | \\ X-R-(Y)_{n-1} \end{array} \quad (1)$$

wherein X and $X^1$ are carboxyl groups or acid anhydride groups and X and $X^1$ may be the same or different groups; Y is a carboxyl group, a hydroxyl group, an acid anhydride group or an amino group; n is an integer of 1 or more; R is a residue of aromatic, aliphatic, alicyclic or heterocyclic group, or a group of the formula:

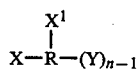

in which $R_1$ and $R_2$ are independently a residue of aromatic, aliphatic, alicyclic or heterocyclic group; Z is $-CH_2-$, $-CO-$, $-SO_2-$ or $-O-$; and m and l are independently an integer of 1 or 2, in an amount of 0 to 30 equivalent percents based on the total carboxyl equivalent, with
(B) an alcohol component, and
(C) an acid component.

In the above formula (2), $R_1$ and $R_2$ are preferably benzene rings.

The polyamideimide resin (A) can be obtained by reacting in a cresol type solvent (a) a polyisocyanate containing an isocyanurate ring, (b) a diisocyanate, (c) a lactam, (d) a tricarboxylic acid anhydride, and (e) a compound different from the above-mentioned (d) and represented by the formula (1).

The polyisocyanate containing an isocyanurate ring (a) can be obtained by trimerization of an aromatic diisocyanate, an aliphatic diisocyanate, an alicyclic diisocyanate or a polyisocyanate. Examples of the aromatic diisocyanates are tolylene diisocyanate, xylylene diisocyanate, 4,4'-diphenylmethane diisocyanate, 4,4'-diphenylether diisocyanate, naphthalene 1,5-diisocyante, etc. Examples of the aliphatic diisocyanates are ethylene diisocyanate, 1,4-tetramethylene diisocyanate, 1,6-hexamethylene diisocyanate, etc. Examples of alicyclic diisocyanates are cyclobutene 1,3-diisocyanate, cyclohexane 1,3-diisocyanate, cyclohexane 1,4-diisocyanate, isophorone diisocyanate, etc. Examples of polyisocyanates are triphenylmethane 4,4',4''-triisocyanate, etc. Considering heat resistance, trimerization reaction products of aromatic diisocynate such as tolylene diisocyanate and 4,4'-diphenylmethane diisocyanate, and a trimerization reaction product of isophorone diisocyanate are preferable as the component (a). These polyisocyanates containing an isocyanurate ring may be used alone or as a mixture of two or more of them.

Processes for producing these polyisocyanurates containing an isocyanurate ring are disclosed, for example, in Japanese Patent Appln Kokoku (Post-Exam Publn) No. 34209/81.

As the diisocyanate (b), there can be used the aromatic diisocyanates, the aliphatic diisocyanates and the alicyclic diisocyanates mentioned above for giving the component (a). Considering heat resistance, the use of an aromatic diisocyanate such as tolyelne diisocyanate, 4,4'-diphenylmethane diisocyanate, 4,4'-diphenylether diisocyanate, or xylylene diisocyanate is preferable. These diisocyanates can be used alone or as a mixture thereof.

The isocyanurate ring-containing polyisocyanate (a) is used as a branching component and the isocyanate ring skelton gives excellent heat resistance. The isocyanurate ring-containing polyisocyanate (a) is used in an amount of 0 to 30 equivalent percents based on the total isocyanate equivalent. If the amount is over 30 equivalent percents, the degree of branching is so increased that a gelation sometimes takes place before reaching to the desired molecular weight. On the other hand, the isocyanurate ring-containing polyisocyanate (a) may not be used in some cases.

The lactam (c) is an important raw material for making the polyamideimide resin soluble in a cresol type solvent. Any ones which can react with an isocyanate group or an acid anhydride group and make the resulting polymer soluble in a cresol type solvent can be used. Examples of the lactams are 2-pyrrolidone, ω-lauryllactom and ε-caprolactam. Taking solbility, reactivity and price into consideration, ε-caprolactam is preferable.

The amount of lactam is not limited particularly, but taking heat resistance into consideration, the use of 10 to 100 equivalent percents based on the total isocyanate equivalent is preferable (1 mole of the lactam being 2 equivalents). The use of the lactam in an amount of 30 to 80 equivalent percents is particularly preferable.

As the tricarboxylic acid anhydride (d), there can be used trimellitic acid anhydride, butane-1,2,4-tricarboxylic acid anhydride, etc. Considering heat resistance, the use of trimellitic acid anhydride is preferable.

The compound of the formula (1) (e) which is different from the component (d) has at least two carboxyl groups or acid anhydride groups which can be resinified by forming an amide linkage and/or imide linkage together with a polyisocyanate, and if necessary, also has a carboxyl group, a hydroxyl group, an acid anhydride group or an amino group. Taking flexibility, heat resistance, wear resistance, resistance to Freon, etc., into consideration, preferable examples of the compounds of the formula (1) are trimesic acid, tris(2-carboxyethyl) isocyanurate, 3,3',4,4'-benzophenonetetracarboxylic acid, 1,2,3,4-butanetetracarboxylic acid, 1,2,4-butanetricarboxylic acid and their anhydrides. Further, reaction products of trimellitic anhydride and an isocyanurate ring-containing polyisocyanate as mentioned above such as a trimer of tolylene diisocyanate, a trimer of isophorone diisocyanate, etc., more concretely, a polyimide-polycarboxylic acid and the like can be used.

These compounds of the formula (1) (e) can be used alone or as a mixture thereof. The compound (e) is used in an amount of 0 to 30 equivalent percents based on the total carboxyl equivalent. If the amount is over 30 equivalent percents, the degree of branching is so increased that a gelation sometimes takes place before reaching to the desired molecular weight. On the other hand, the compound of the formula (1) (e) may not be used in some cases.

From the viewpoints of flexibility of the resulting polyamideimide resin and transparency of a solution obtained by disolving the resulting polyamideimide in a cresol type solvent, it is preferable to make the sum of the equivalent percent of the component (a) based on the total isocyanate equivalent and the equivalent percent of the component (e) based on the total carboxyl equivalent in the range of 3 to 30 equivalent percents. In this case, 1 equivalent of each of a hydroxyl group, a carbonyl group, an acid anhydride group and an amino group in the acid components is regarded as 1 equivalent of carboxyl group.

Further, taking heat resistance and flexibility into consideration, it is preferable to use the isocyanate group-containing components (a) and (b) and the carboxyl group- or acid anhydride group-containing components (d) and (e) in terms of an equivalent ratio of carboxyl group to isocyanate group in the range of 0.6/1 to 1.5/1, more preferably 0.7/1 to 1.15/1.

The reaction can be carried out by charging all the raw materials, i.e., the components (a) to (e), to a reactor, or charging one or more raw materials stepwisely depending on purposes. It is preferable to carry out the reaction at a temperature of 180°–250° C., more preferably 200° to 220° C. after charging all the components to be reacted. The progress of the reaction can be checked by measuring bubbles of carbon dioxide generated and a viscosity of the reaction solution.

As the cresol type solvent, there can be used cresol, phenol, xylenol, and the like. It is also possible to use cresylic acid, which is a mixture of these compounds.

When there are used as the raw materials a diisocyanate, a lactam, a tricarboxylic acid anhydride and as a branching component a tri- or higher polyfunctional polycarboxylic acid such as trimesic acid, tris(2-carboxyethyl) isocyanurate or a reaction product of an isocyanurate ring-containing polyisocyanate and trimellitic acid anhydride, the resulting polyamideimide is a branched high polymer.

Considering heat resistance, flexibility, wear resistance, price, and the like, it is preferable to use as the raw materials a diisocyanate, a lactam, a tricarboxylic acid anhydride and an isocyanurate ring-containing polyisocyanate to give a branched polyamideimide resin soluble in a cresol type solvent.

The polyamideimide resin (A) is then reacted with an alcohol component (B) and an acid component (C) with heating.

As the alcohol component (B), it is preferable to use a di- or higher polyhydric alcohol. Examples of dihydric alcohols are ethylene glycol, neopently glycol, 1,4-butanediol, 1,6-hexanediol, 1,6-cyclohexanedimethanol, etc. Examples of trihydric or higher polyhydric alcohols are glycerine, trimethylolpropane, tris-2-hydroxyethyl isocyanurate, tris-2-hydroxypropyl isocyanurate, pentaerythitol, etc. From the viewpoint of heat resistance, it is preferable to use a trihydric or higher polyhydric glycol in an amount of 30 equivalent percents or more based on the total alcohol component. Needless to say, co-use of monohydric alcohol is possible so long as such a monohydric alcohol does not reduce heat resistance.

Considering crazing resistance, thermal shock resistance, peeling resistance, and costs, the use of glycerine and ethylene glycol is preferable. Further, considering heat resistance, resistance to refrigerant, and resistance to hydrolysis in addition to the above-mentioned properties, the use of tris(2-hydroxyethyl) isocyanurate is particularly preferable.

As the acid component (C), it is preferable to use a divalent or higher polyvalent carboxylic acid or its derivative such as an alkyl ester, anhydride, thereof. Examples of divalent carboxylic acids and derivatives thereof are dimethyl terephthalate, terephthalic acid, dimethyl isophthalate, isophthalic acid, adipic acid, etc. Examples of trivalent or higher polyvalent carboxylic acids and derivatives thereof are trimellitic acid anhydride, trimellitic acid, trimesic acid, 3,3',4,4'-benzophenonetetracarboxylic acid, 1,2,3,4-butanetetracarboxylic acid, 1,2,4-butanetricarboxylic acid, and the like. Other polycarboxylic acids usually used as an acid component in polyester varnish, polyimide varnish used for enamelled wire may also be used. Considering the balance of properties and cost, the use of dimethyl terephthalate or terephthalic acid is preferable. These acid components may be used alone or as a mixture thereof.

As to the amounts of the polyamideimide resin (A), the alcohol component (B) and the acid component (C), it is preferable to use 25 to 500 parts by weight of the polyamideimide resin (A) based on 100 parts by weight of the total of the alcohol component (B) and the acid component (C). Further, it is preferable to use the alcohol component (B) and the acid component (C) in an equivalent ratio of (B)/(C)=0.6−2.0/1.

If the proportion of the polyamideimide (A) is lowered, an increase of heat resistance becomes insufficient, while if the proportion of the polyamideimide (A) is increased, performance is improved but the resin concentration is undesirably lowered, which is disadvantageous from the viewpoint of productivity and cost of enamelled copper wire. On the other hand, if the equivalent ratio of the alcohol component to the acid component is exremely low, curability of the resin produced is lowered, while if the equivalent ratio is too high, properties of enamelled wire such as cut through temperature are undesirably lowered.

The reaction of the polyamideimide resin (A), the alcohol component (B) and the acid component (C) with heating is not particularly limited and can be carried out under the conditions werein an esterification reaction, an ester interchange reaction and/or amide ester interchange reaction substantially take place.

Usually, the reaction is carried out in the presence of an esterification or ester interchange catalyst such as tetrabutyl titanate, lead acetate, dibutyltin diluarate, zinc naphthenate, or the like at a temperature of preferably 120° C.–240° C. If necessary, a cresol type solvent mentioned above may be added to the reaction system considering the viscosity thereof.

The heat resistant resin thus produced can be used as a heat resistant resin composition such as a varnish for enamelled copper wire by diluting the resin to a suitable viscosity with a solvent such as cresol, phenol, N-methylpyrrolidone, xylene, or the like, or as a mixture thereof.

The heat resistant resin composition can be used for heat resistant surface coatings, insulating varnish for producing heat resistant insulated wire, heat resistant film, etc.

In the case of producing insulated wire, the heat resistant resin composition can directly be applied to an electric conductor or can be applied to an electric conductor together with one or more other insulating coatings. In such cases, the heat resistant resin composition may further contain 0.1 to 25% by weight based on the resin component one or more other resins such as an epoxy resin, a phenol-formaldehyde resin, a polyether resin, a polyamide resin, a polyesterimide resin, a polyhydantoin resin, an alkoxy modified amino resin, a polysulfone resin, a furane resin, a phenoxy resin, and the like, or 0.05 to 20% by weight based on the resin component one or more polyisocyanate generators, metallic salts of organic acids, titanium compounds such as tetrabutyl titanate, and the like.

The production of enamelled wire can be carried out by using conventional conditions for coating, baking and the like.

This invention is illustrated by way of the following Examples.

REFERENCE EXAMPLE 1

| Ingredients | Grams | Moles |
| --- | --- | --- |
| Dimethyl terephthalate | 518.0 | 2.67 |
| Ethylene glycol | 113.0 | 1.83 |
| Glycerine | 92.0 | 1.0 |
| Tetrabutyl titanate (catalyst) | 0.72 | |
| Cresol | 38.0 | |

The ingredients mentioned above were placed in a four-necked flask equipped with a thermometer, a stirrer, a fractional distillation tube and heated to 150° C. under a nitrogen stream. The reaction temperature was raised to 230° C. over 6 hours, while removing the methanol generated by the reaction. The reaction was further continued at 230° C. until a gelation time measured on a hot plate at 250° C. became 160 sec or less. Cresol was added to the resulting hot resin to make the resin content 50% by weight. Further, the resin solution was maintained at 120° C., and 3% by weight based on the resin component of tetrabutyl titanate was gradually added to the resin solution, followed by stirring for 30 minutes to give a polyester varnish.

REFERENCE EXAMPLE 2

| Ingredients | Grams | Moles |
| --- | --- | --- |
| Dimethyl terephthalate | 426.8 | 2.20 |
| Ethylene glycol | 62.0 | 1.0 |
| Tris(2-hydroxyethyl) isocyanurate | 323.6 | 1.24 |
| Tetrabutyl titanate | 0.81 | |
| Cresol | 91.0 | |

The above-mentioned ingredients were placed in a four-necked flask equipped with a thermometer, a stirrer, a fractional distillation tube and heated to 150° C. under a nitrogen stream. The reaction temperature was raised to 220° C. over 6 hours, while removing the methanol generated by the reaction. The reaction was further continued at 220° C. until a gelation time measured on a hot plate at 250° C. became 120 sec or less. Cresol was added to the resulting hot resin to make the resin content 45% by weight. Further, tetrabutyl titanate in an amount of 4% by weight based on the resin component was gradually added to the resin solution maintained at 120° C. to give a polyester varnish.

REFERENCE EXAMPLE 3

Synthesis of a polyisocyanate containing an isocyanurate ring.

| Ingredients | Grams |
| --- | --- |
| Tolyene diisocyanate | 600 |
| Xylene | 600 |
| 2-Dimethylaminoethanol (catalyst) | 1.8 |

The above-mentioned ingredients were placed in four-necked flask equipped with a thermometer and a stirrer and heated to 140° C. under a nitrogen stream. The reaction was proceeded at that temperature until the isocyanate group content became 25% by weight (the initial content 48% by weight).

The resulting compound had absorptions at 1710 cm$^{-1}$ and 1410 cm$^{-1}$ due to an isocyanurate ring and at 2260 cm$^{-1}$ due to an isocyanate group in infrared spectrum.

EXAMPLE 1

(1) Synthesis of polyamideimide resin

| Ingredients | Grams | Equivalent |
| --- | --- | --- |
| Polyisocyanate containing an isocyanurate ring synthesized in Reference Example 3 | 50.0 | 0.15 |
| 4,4'-Diphenylmethane | 113.3 | 0.91 |

-continued

| Ingredients | Grams | Equivalent |
| --- | --- | --- |
| diisocyanate | | |
| Trimellitic acid anhydride | 115.2 | 1.20 |
| ε-Caprolactam | 39.6 | 0.70 |
| Cresol | 278.5 | |

The above-mentioned ingredients except for trimellitic acid anhydride were placed in a four-necked flask equipped with a thermometer, a stirrer, a fractional distillation tube and reacted at 180° C. for 1 hour. Subsequently, trimellitic acid anhydride was added to the flask. The temperature was raised to 205° C., at which temperature the reaction was conducted for 5 hours to give a resin solution. The resulting resin insoluble in methanol had a reduced viscosity ($\eta_{sp}/c$) (in dimethylformamide (DMF), 0.5% resin concentration at 30° C.) of 0.12.

(2) Synthesis of poly(amideimide ester)

| Ingredients | Grams | Equivalent |
| --- | --- | --- |
| Dimethyl terephthalate | 245.0 | 2.53 |
| Tris(2-hydroxyethyl) isocyanurate | 263.7 | 3.04 |
| Tetrabutyl titanate | 0.7 | |

To the resin solution obtained in (1), the above-mentioned ingredients were added and the reaction was carried out for 4 hours while maintaining the temperature at 170° C.-200° C. Subsequently, cresol was added to the resin solution to make the resin content 37% by weight. Then, 3% by weight of tetrabutyl titanate and 0.2% by weight of zinc octoate (as metal concent), each based on the resin content, were added to the resin solution to give a uniform and transparent varnish.

EXAMPLE 2

A polyamideimide resin was synthesized in the same manner as described in Example 1. Then, 48.5 g of dimethyl terephthalate, 48.5 g of tris(2-hydroxyethyl) isocyanurate and 0.5 g of tetrabutyl titanate were added to the reaction solution and the reaction was carried out at 205° C. until a gelation time measured on a hot plate at 250° C. became 180 sec or less.

Then cresol was added to the resin solution to make the resin content 35% by weight, followed by addition of 2% by weight of tetrabutyltitanate, 1% by weight of a melamine resin (ML-20, a trade name, mfd. by Hitachi Chemical Co., Ltd.) and 1% by weight of a block isocyanate (Desmodur CT Stable, mfd. by Bayer AG.), each based on the resin content, to give a varnish.

EXAMPLE 3

(1) Synthesis of polyamideimide resin

| Ingredients | Grams | Equivalent |
| --- | --- | --- |
| Trimesic acid | 6.3 | 0.09 |
| 3,3',4,4'-Benzophenonetetracarboxylic acid dianhydride | 11.3 | 0.07 |
| ε-Caprolactam | 33.9 | 0.60 |
| 4,4'-Diphenylmethane diisocyanate | 125.0 | 1.00 |
| Trimellitic acid anhydride | 91.2 | 0.95 |
| Cresol | 185.0 | |

-continued

| Ingredients | Grams | Equivalent |
| --- | --- | --- |
| Xylene | 10.0 | |

The above-mentioned ingredients were placed in a four-necked flask equipped with a thermometer, a stirrer, a fractional distillation tube and heated gradually to 205° C. The reaction was conducted at that temperature until a Gardner viscosity measured by using a 25% by weight (resin content) cresol solution at 25° C. became 90 sec or more. Subsequently 50 g of cresol was added to the reaction solution to give a resin solution.

(2) Synthesis of poly(amideimide ester)

| Ingredients | Grams | Equivalent |
| --- | --- | --- |
| Dimethyl terephthalate | 194.0 | 2.00 |
| Ethylene glycol | 12.4 | 0.40 |
| Tris(2-hydroxyethyl) isocyanurate | 174.0 | 2.00 |
| Tetrabutyl titanate (catalyst) | 0.4 | |

To the resin solution obtained in (1), the above-mentioned ingredients were added and heated gradually to 205° C. The reaction was carried out at that temperature until a Gardner viscosity measured by using a 40% by weight (resin content) cresol solution at 25° C. became 120 sec. Then, cresol was added to the resin solution to make the resin content 45% by weight, followed by addition of xylene to make the resin content 40% by weight. Then, 3% by weight of tetrabutyl titanate, 0.5% by weight of a phenol resin (VP-51 NY, a trade name, mfd. by Hitachi Chemical Co., Ltd.) and 0.15% by weight of zinc naphthenate (as metal content), each based on the resin content, were added to the resin solution to give a varnish. The varnish had a nonvolatile content of 40% by weight and a viscosity of 65 poises at 30° C.

EXAMPLE 4

(1) Synthesis of polyamideimide resin

| Ingredients | Grams | Equivalent |
| --- | --- | --- |
| 4,4'-Diphenylmethane diisocyanate | 110.0 | 0.88 |
| ε-Caprolactam | 36.7 | 0.65 |
| Trimellitic acid anhydride | 97.0 | 1.01 |
| Tris(2-carboxyethyl) isocyanurate | 2.3 | 0.02 |
| Polyisocyanate containing an isocyanurate ring synthesized in Reference Example 3 | 40.0 | 0.12 |
| Cresol | 250.0 | |

The above-mentioned ingredients except for trimellitic acid anhydride and tris(2-carboxyethyl) isocyanurate were placed in a four-necked flask equipped with a thermometer, a stirrer, and a fractional distillation tube and heated at 180° C. under a nitrogen stream to conduct the reaction for 90 minutes. Then, the temperature was lowered to 160° C. and trimellitic acid anhydride and tris(2-carboxyethyl) isocyanurate were added to the reaction solution. Then, the temperature was raised to 205° C., at which temperature the reaction was conducted until a Gardner viscosity measured by using a 25% by weight (resin content) cresol solution at 25° C. became 30 sec. to give a resin solution. The resulting polyamideimide resin insoluble in methanol had a reduced viscosity ($\eta_{sp}/c$) (in DMF, 0.5%) of 0.12.

(2) Synthesis of poly(amideimide ester)

| Ingredients | Grams | Equivalent |
|---|---|---|
| Dimethyl terephthalate | 485.0 | 5.00 |
| Tris(2-hydroxyethyl) isocyanurate | 522.0 | 6.00 |
| Ethylene glycol | 31.0 | 1.00 |
| Tetrabutyl titanate | 1.3 | |

To the resin solution obtained in (1), the above-mentioned ingredients were added at 170° C. Then, the temperature was increased to 195° C. and the reaction was conducted until a gelation time measured on a hot plate at 250° C. became 90 sec.

Then, cresol was added to the resin solution to make the resin content 40% by weight, followed by addition of 3% by weight of tetrabutyl titanate and 0.15% by weight of zinc naphthenate (as metal content), each based on the resin content, to give a varnish.

EXAMPLE 5

(1) Synthesis of polyamideimide resin

| Ingredients | Grams | Equivalent |
|---|---|---|
| 4,4'-Diphenylmethane diisocyanate | 117.5 | 0.94 |
| Polyisocyanate containing an isocyanurate ring synthesized in Reference Example 3 | 26.7 | 0.08 |
| ε-Caprolactam | 36.7 | 0.65 |
| Trimellitic acid anhydride | 96.0 | 1.00 |
| Cresol | 180.0 | |
| Xylene | 10.0 | |

The above-mentioned ingredients except for trimellitic acid anhydride were placed in a four-necked flask equipped with a thermometer, a stirrer, and a fractional distillation tube and heated to 170° C. in a nitrogen stream. After the reaction at that temperature for 60 minutes, trimellitic acid anhydride was added to the reaction solution. The temperature was raised to 210°–215° C., and the reaction was carried out at that temperature until a Gardner viscosity measured by using a 25% by weight (resin content) cresol solution at 25° C. became 160 sec to give a resin solution. The resulting polyamideimide resin insoluble in methanol had a reduced viscosity ($\eta_{sp}/c$) (in DMF, 0.5%) of 0.26.

(2) Synthesis of poly(amideimide ester)

| Ingredients | Grams | Equivalent |
|---|---|---|
| Dimethyl terephthalate | 38.8 | 0.40 |
| Tris(2-hydroxyethyl) isocyanurate | 43.5 | 0.50 |
| Tetrabutyl titanate | 0.2 | |

To the resin solution obtained in (1), the above-mentioned ingredients were added and heated to 210° C. The reaction was carried out until a Gardner viscosity measured by using a 30% by weight (resin content) cresol solution at 25° C. became 100 sec. Then, cresol was added to the resin solution to make the resin content 30% by weight, followed by addition of 1.5% by weight of tetrabutyl titanate, and 1.0% by weight of a phenol resin (PR-2084, a trade name, mfd. by Hitachi Chemical Co., Ltd.), each based on the resin content, to give a varnish.

EXAMPLE 6

(1) Synthesis of polyamideimide resin

| Ingredients | Grams | Equivalent |
|---|---|---|
| Trimellitic acid anhydride | 86.4 | 0.9 |
| ε-Caprolactam | 45.2 | 0.8 |
| 4,4'-Diphenylmethane diisocyanate | 125.0 | 1.0 |
| Cresol | 153.0 | |

The above-mentioned ingredients except for trimellitic acid anhydride were placed in a four-necked flask equipped with a thermometer, a stirrer and a fractional distillation tube and reacted at 160° C. for 60 minutes in a nitrogen stream. Subsequently, trimellitic acid anhydride was added to the reaction solution and the temperature was raised to 210° C. The reaction was carried out at that temperature for 15 hours to give a resin solution.

(2) Synthesis of poly(amideimide ester)

| Ingredients | Grams | Equivalent |
|---|---|---|
| Dimethyl terephthalate | 145.5 | 1.5 |
| Tris(2-hydroxyethyl) isocyanurate | 226.2 | 2.6 |
| Tetrabutyl titanate | 0.5 | |

To the resin solution obtained in (1), the above-mentioned ingredients were added and heated to 205° C., at which temperature the reaction was carried out until a Gardner viscosity measured by using a 30% by weight (resin content) cresol solution at 25° C. became 50 sec. Then, cresol was added to the resin solution to make the resin content 35% by weight, followed by the addition of 3.0% by weight of tetrabutyl titanate and 0.2% by weight of zinc naphthenate (as metal content), each based on the resin content, to give a varnish.

EXAMPLE 7

(1) Synthesis of polyamideimide resin

| Ingredients | Grams | Equivalent |
|---|---|---|
| Trimellitic acid anhydride | 90.7 | 0.945 |
| ε-Caprolactam | 36.7 | 0.650 |
| 1,2,3,4-Butanetetracarboxylic acid | 12.3 | 0.105 |
| 4,4'-Diphenylmethane diisocyanate | 125.0 | 1.000 |
| Cresol | 216.6 | |

The above-mentioned ingredients except for trimellitic acid anhydride and 1,2,3,4-butanetetracarboxylic acid were placed in a four-necked flask equipped with a thermometer, a stirrer, and a fractional distillation tube and reacted at 160° C. for 60 minutes in a nitrogen stream. Subsequently, trimellitic acid anhydride and 1,2,3,4-butanetetracarboxylic acid were added to the reaction solution and the temperature was raised to 210° C. to carry out the reaction for 10 hours to give a resin solution.

(2) Synthesis of poly(amideimide ester)

| Ingredients | Grams | Equivalent |
|---|---|---|
| Dimethyl terephthalate | 236.8 | 2.44 |
| Tris(2-hydroxyethyl) isocyanurate | 254.8 | 2.93 |
| Tetrabutyl titanate | 0.7 | |

To the resin solution obtained in (1), the above-mentioned ingredients were added and heated to 200° to 205° C. The reaction was carried out at that temperature until a gelation time measured on a hot plate at 250° C. became 150 sec. Then, cresol was added to the resin solution to make the resin content 35% by weight, followed by addition of 3.0% by weight of tetrabutyl titanate and 0.15% by weight of zinc octoate (as metal content), each based on the resin content, to give a varnish.

Each of the thus prepared varnishes was coated on soft copper wire having a diameter of 1.0 mm 8 times and baked in a vertical type furnace having a length of 4.5 m and heated at 300° C. at a lower portion and 400° C. at an upper portion to give enamelled wire having a coating film thickness of 0.037–0.042 mm.

On the other hand, the varnish obtained in Example 1 was coated on soft copper wire having a diameter of 1.0 mm 5 times and baked under the same conditions as mentioned above to give a coating film thickness of 0.031 mm. The resulting enamelled copper wire was coated with a general purpose polyamideimide varnish (HI-405, a trade name, mfd. by Hitachi Chemical Co., Ltd.) three times, followed by baking to give enamelled copper wire having a coating film thickness of 0.040 mm (Example 8).

Properties of the thus obtained enamelled copper wire were tested and listed in Table 1.

TABLE 1

| Properties | Test conditions | Example 1 | Example 2 | Example 3 | Example 4 | Example 5 | Example 6 | Example 7 | Example 8 |
|---|---|---|---|---|---|---|---|---|---|
| Flexibility | Mandrel test | 1 × OK | 1 × OK | 1 × OK | 1 × OK | 1 × OK | 1 × OK | 1 × OK | 1 × OK |
| Abrasion resistance | Load 600 g (repeated scrape time) | 68 | 108 | 70 | 45 | 105 | 65 | 55 | 140 |
| Heat shock resistance | Temperature passing the Mandrel test after aging for 1 hr. (° C) | 220 | 260 | 240 | 170 | 260 | 220 | 200 | 300 |
| Dielectric breakdown strength | Normal state (kV) | 13.1 | 12.9 | 12.9 | 13.2 | 12.8 | 12.8 | 13.0 | 13.0 |
| | After heat aging at 240° C. for 168 hrs (kV) | 9.8 | 11.4 | 9.6 | 6.1 | 11.0 | 9.6 | 8.8 | 12.6 |
| | Retention rate (%) | 74.8 | 88.4 | 74.4 | 46.2 | 85.9 | 75.0 | 67.7 | 96.9 |
| Cut through resistance | Cut through temp. load 700 g (° C.) | 371 | 375 | 370 | 380 | 368 | 342 | 375 | 395 |
| Heat resistance | IEEE No. 57 Life test | | | | | | | | |
| | Av. life time at 260° C. (hrs) | 700 | 730 | 680 | 390 | 890 | 390 | 440 | 980 |
| | Av. life time at 240° C. (hrs) | 2250 | 2240 | 2200 | 1570 | 2650 | 1450 | 1600 | 2620 |
| Resistance to hydrolysis | Retention rate*[1] (%) | 70 | 75 | 70 | 51 | 78 | 52 | 71 | 91 |
| Resistance to Freon | R-22*[2] Blister test | | | | | | | | |
| | Blistering Temp. 120° C. - 10 min. | Good | Good | Good | Good | Good | Good | Good | Good |
| | 130° C. - 10 min. | Good | Good | Good | Good | Good | Good | Good | Good |
| | 150° C. - 10 min. | Good | Good | Good | Blistered | Good | Blistered | Blistered | Good |

| Properties | Test conditions | Reference Example 1 | Reference Example 2 |
|---|---|---|---|
| Flexibility | Mandrel test | 1 × OK | 1 × OK |
| Abrasion resistance | Load 600 g (repeated scrape time) | 40 | 35 |
| Heat shock resistance | Temperature passing the Mandrel test after aging for 1 hr. (°C.) | 130 | 160 |
| Dielectric breakdown strength | Normal state (kV) | 12.7 | 12.0 |
| | After heat aging at 240° C. for 168 hrs (kV) | 1.6 | 4.2 |
| | Retention rate (%) | 13 | 35 |
| Cut through resistance | Cut through temp. load 700 g (°C.) | 330 | 370 |
| Heat resistance | IEEE No. 57 Life test | | |
| | Av. life time at 260° C. (hrs) | 80 | 260 |
| | Av. life time at 240° C. (hr.) | 230 | 950 |
| Resistance to hydrolysis | Retention rate*[1] (%) | 25 | 40 |
| Resistance to Freon | R-22*[2] Blister test | | |
| | Blistering Temp. 120° C. - 10 min. | Blistered | Blistered |
| | 130° C. - 10 min. | Blistered | Blistered |
| | 150° C. - 10 min. | Blistered | Blistered |

Note to TABLE 1:

*[1]Retention rate = $\dfrac{\text{Breakdown voltage after deterioration}}{\text{Breakdown voltage at normal state}} \times 100\ (\%)$ Deterioration was conducted by subjecting a sample to heating at 180° C. for 2 hours in 2 ml of water placed in a closed pressure vessel having an inner volume of 670 ml (water volume: 0.3% of the inner volume).

*[2]In an autoclave having an inner volume of 1000 ml, 350 g of R-22, 350 g of refrigerator oil and a model coil were placed and heated at 125° C. for 168 hours. Then the autoclave was opened and the model coil was immediately transpered to a drier heated at 120° C., 130° C. or 150° C. and heated for 10 minutes to observe blistering.

The results of Table 1 clearly show that the heat resistant resin obtained by reacting the polyamideimide resin which has been prepared by using a lactam as a reactant with an alcohol component and an acid component is:

(1) remarkably improved in heat shock resistance, heat resistance, resistance to hydrolysis and abrasion resistance compared with conventional polyester varnishes, and (2) remarkably improved in the above-mentioned properties when the polyamideimide content is large as shown in Examples 2 and 5.

Further Example 8 shows that the heat resistant resin of this invention can be used in combination with other resin or resins such as a polyamideimide resin, etc., to give good properties.

As mentioned above, the heat resistant resin of this invention is improved in heat resistance, heat shock resistance, resistance to hydrolysis, abrasion resistance and the like compared with polyester varnishes and has a great industrial value.

What is claimed is:

1. An insulated wire comprising a coating of a heat resistant resin composition on an electric conductor; said heat resistant resin composition comprising a heat resistant resin and a phenolic solvent; the heat resistant resin being produced by reacting with heating
   (A) a polyamideimide resin obtained by reacting in a phenolic solvent the following components (a) to (e):
   (a) a polyisocyanate containing an isocyanurate ring in an amount of 0 to 30 equivalent percents based on the total isocyanate equivalent,
   (b) a diisocyanate free of an isocyanurate ring,
   (c) a lactam,
   (d) a tricarboxylic acid anhydride, and
   (e) a compound different from the component (d) and selected from the group consisting of trimesic acid, tris(2-carboxyethyl) isocyanurate, 3,3',4,4'-butanetricarboxylic acid, anhydrides thereof and a reaction product of trimellitic anhydride and a trimer of isophorone diisocyanate or a trimer of tolylene diisocyanate, in an amount of 0 to 30 equivalent percents based on the total carboxyl equivalent, with
   (B) an alcohol component selected from the group consisting of a di- or higher polyhydric alcohol and a mixture of a di- or higher polyhydric alcohol with a monohydric alcohol, and
   (C) an acid component selected from the group consisting of a divalent or higher polyvalent carboxylic acid, an ester thereof and an anhydride thereof.

2. An insulated wire according to claim 1, wherein the phenolic solvent is cresol, phenol, N-methyl-pyrrolidone, xylene, or a mixture thereof.

3. An insulated wire according to claim 1, wherein said heat resistant resin composition further comprises at least one member selected from the group consisting of metallic salts of organic acids and titanium compounds in an amount of 0.05 to 20% by weight based on the weight of the heat resistant resin.

4. An insulated wire according to claim 3, wherein the titanium compound is tetrabutyltitanate.

5. An insulated wire according to claim 1 wherein said heat resistant resin composition further comprises, based on the weight of the heat resistant resin, 0.1 to 25% by weight of at least one member selected from the group consisting of an epoxy resin, a phenol-formaldehyde resin, a polyether resin, a polyamide resin, a polyesterimide resin, a polyhydanotoin resin, an alkoxy modified amino resin, a polysulfone resin, a furan resin, and a phenoxy resin.

6. An insulated wire according to claim 1, wherein the polyisocyanate containing an isocyanurate ring is obtained by a trimerization of an aromatic diisocyanate, an aliphatic diisocyanate, an alicyclic diisocyanate or a polyisocyanate.

7. An insulated wire according to claim 1, wherein the diisocyanate free of an isocyanurate ring is selected from the group consisting of an aromatic diisocyanate, an aliphatic diisocyanate, and an alicyclic diisocyanate.

8. An insulated wire according to claim 7, wherein said aliphatic diisocyanate is selected from the group consisting of ethylene diisocyanate, 1,4-tetramethylene diisocyanate and 1,6-hexamethylene diisocyanate.

* * * * *

UNITED STATES PATENT AND TRADEMARK OFFICE
CERTIFICATE OF CORRECTION

PATENT NO. : 4,448,844

DATED : May 15, 1984

INVENTOR(S) : OSADA, et al.

It is certified that error appears in the above-identified patent and that said Letters Patent are hereby corrected as shown below:

On title page, left-hand column, please add the following after "[22] Filed: Jul. 28, 1983"

--RELATED U.S. APPLICATATION DATA
[64] Division of Ser. No. 363,799, Mar. 31, 1982, Pat. No. 4,431,758.--

Signed and Sealed this

First Day of January 1985

[SEAL]

Attest:

GERALD J. MOSSINGHOFF

Attesting Officer

Commissioner of Patents and Trademarks